US009696155B2

United States Patent
Tannemaat

(10) Patent No.: US 9,696,155 B2
(45) Date of Patent: Jul. 4, 2017

(54) METHOD AND SYSTEM FOR AUTOMATICALLY DETECTING AND CHECKING PARKING PLACES OF A PARKING ARRANGEMENT

(71) Applicant: N.V. Nederlandsche Apparatenfabriek NEDAP, Groenlo (NL)

(72) Inventor: Gerhard Johan Tannemaat, Groenlo (NL)

(73) Assignee: N.V. NEDERLANDSCHE APPARATENFABRIEK NEDAP, Groenlo (NL)

( * ) Notice: Subject to any disclaimer, the term of this patent is extended or adjusted under 35 U.S.C. 154(b) by 1059 days.

(21) Appl. No.: 13/848,341

(22) Filed: Mar. 21, 2013

(65) Prior Publication Data

US 2013/0253879 A1 Sep. 26, 2013

(30) Foreign Application Priority Data

Mar. 22, 2012 (NL) .................................... 2008517

(51) Int. Cl.
*G01C 15/00* (2006.01)
*G08G 1/14* (2006.01)
*G08G 1/017* (2006.01)
*G08G 1/042* (2006.01)

(52) U.S. Cl.
CPC .............. *G01C 15/00* (2013.01); *G08G 1/017* (2013.01); *G08G 1/146* (2013.01); *G08G 1/149* (2013.01); *G08G 1/042* (2013.01)

(58) Field of Classification Search
CPC ...... G06Q 20/127; G07B 15/02; B60R 25/24; B60R 25/00
USPC ............ 701/45; 705/13, 32; 340/932.2, 901; 702/150
See application file for complete search history.

(56) References Cited

U.S. PATENT DOCUMENTS

| 8,493,237 | B2 | 7/2013 | Grievink et al. |
| 2004/0068433 | A1* | 4/2004 | Chatterjee ............ G06Q 20/127 705/13 |
| 2004/0192352 | A1 | 9/2004 | Vallstrom et al. |

(Continued)

FOREIGN PATENT DOCUMENTS

| EP | 1 742 191 | 1/2007 |
| EP | 2 418 508 | 2/2012 |

(Continued)

*Primary Examiner* — Andrew Schechter
*Assistant Examiner* — Kaleria Knox
(74) *Attorney, Agent, or Firm* — Jacobson Holman, PLLC.

(57) ABSTRACT

Method and system for automatically detecting and checking the use of parking places of a parking arrangement, which is provided with a parking network and a central computer, the parking places being each provided with an electronic parking sensor module, which has an identification code and a vehicle sensor for detecting vehicles in the respective parking places, wherein use is made of electronic license devices, carried along with the vehicles and each having a unique identification number and motion sensor means, which can determine at what time a vehicle comes to a standstill, and wherein information about said time together with the identification number is transmitted to the central computer, which can compare said time with times at which the parking places become occupied, to determine in which parking place the vehicle is parked.

15 Claims, 4 Drawing Sheets

(56) References Cited

U.S. PATENT DOCUMENTS

| | | | | |
|---|---|---|---|---|
| 2009/0248254 A1* | 10/2009 | Mino | ................... | B60R 25/24 |
| | | | | 701/45 |
| 2011/0193721 A1* | 8/2011 | Koie | ................... | B60R 25/00 |
| | | | | 340/901 |
| 2012/0188101 A1* | 7/2012 | Ganot | ................... | G07B 15/02 |
| | | | | 340/932.2 |

FOREIGN PATENT DOCUMENTS

| | | |
|---|---|---|
| KR | 2010 0070079 | 6/2010 |
| NL | 2001994 | 3/2010 |
| NL | 2005776 | 5/2012 |
| NL | 2006154 | 8/2012 |
| WO | 2007/045250 | 4/2007 |
| WO | 2007/066020 | 6/2007 |
| WO | 2012/108763 | 8/2012 |

* cited by examiner

METHOD AND SYSTEM FOR AUTOMATICALLY DETECTING AND CHECKING PARKING PLACES OF A PARKING ARRANGEMENT

The invention relates to a method for automatically detecting and checking the use of at least a number of parking places, each provided with at least one electronic parking sensor module, of a parking arrangement, which is provided with a parking network for communication between the electronic parking sensor modules and a central computer, wherein the electronic parking sensor modules are each provided with an identification code and with at least one vehicle sensor for detecting the presence or absence of a vehicle in the respective parking place;

and wherein use is made of electronic license devices, which can be carried along in or on vehicles which can be parked in the parking places, the license devices being each provided with a unique identification number and with transmitting means to transmit the identification number of the license device of the respective vehicle directly or indirectly to the central computer, wherein the central computer is configured to determine in which parking place the respective vehicle is parked. The invention furthermore relates to a system for use of the method.

In the following description, "parking place" is understood to mean a parking spot or a parking bay or parking space for a single vehicle. "Parking arrangement" is understood to mean an array of a number of parking places, such as, for instance, a parking lot, a parking garage, a parking zone, a parking lane or the like. "Vehicle" is understood to mean any type of vehicle that can be placed in a parking place, such as, for instance, a passenger car, a motorcycle, a van, a camper, an autobus, trailer, etc.

An example of a parking arrangement in which the present invention can be used is described in Dutch patent 2001994, which is considered to be incorporated herein by reference.

In the parking arrangement known from Dutch patent 2001994 or similar parking arrangements with a vehicle detection system, with the aid of parking sensor modules, which, for instance, can each comprise one or more magnetic sensors, the presence or absence of a vehicle in a particular parking place can be detected wirelessly. In the known arrangements, a signal representing the status of a parking place, i.e., "occupied" or "vacant", is passed on to a central computer via a parking sensor network present for that purpose, in this description briefly named parking network. The parking network can be a wireless or a cabled network or a combination of the two, but is preferably a substantially wireless network.

In these known parking arrangements it is thus always known which parking places are occupied and which parking places are not occupied. Oftentimes, however, it is desirable to know, at least of a number of parking places of a parking arrangement, by whom a parking place has been put into use. For instance, particular parking places may be reserved or intended for specific groups of users and/or specific vehicles. Thus, for instance, a number of parking places of a parking arrangement may be intended for the disabled. Also, parking places may be reserved for license-holders, or for VIP parkers, or for rental cars, for instance at an airport. These may be both specific parking places and parking places to be freely chosen by the user. Regarding such parking places, the need exists to be able to detect, preferably automatically, whether a parking place is being used by a person and/or vehicle authorized to do so.

A method and system of the above-mentioned kind are known from EP 2 418 508 A1 (Selex Elsag). This reference describes a method and apparatus for determining whether a parking place is occupied, and if so, whether the parking place is occupied legitimately or illegitimately. To this end, either the parking sensor modules or the license devices, or transmitting devices communicatively connected therewith in the vehicles, are configured to transmit in succession both the identification code of a parking sensor module and the identification number of a license device to an access point connected with a central processing unit.

In WO 2007/066020 (RFID Systems) a method is described for detecting a rightful or wrongful occupation of line-up places or landing places for mobile devices, in particular pleasure boats. For this purpose, use is made of sensors arranged at each landing place, which are provided with a position code and which can detect the presence or absence of a vessel, though not the identification code of a vessel. The identification code of a vessel is stored in a transponder which can be read out electronically at a great distance. The transponders are read out wirelessly by a single or a minor number of interrogation devices. On the basis of the read-out identification codes and the position codes of the occupied and/or vacant landing places, a central processing unit determines approximately whether the occupied landing places are occupied rightfully or not.

According to the invention, a method of the above-described kind is characterized in that the license devices are provided with motion sensor means, which together with time measuring means can determine exactly at what time a vehicle comes to a standstill; wherein the transmitting means are configured to transmit information about said time together with the identification number of the license device of the respective vehicle directly or indirectly to the central computer; and wherein the central computer on the basis of a comparison of said time with times at which the parking places become occupied determines in which parking place the respective vehicle is parked.

A system of the above-described kind is characterized, according to the invention, in that the license devices (30) are provided with motion sensor means (33), which together with time measuring means (35) can determine exactly at what time ($t_1$) a vehicle comes to a standstill; wherein the transmitting means (36, 37) are configured to transmit information about the time ($t_1$) together with the identification number of the license device of the respective vehicle directly or indirectly to the central computer (29); and wherein the central computer (29) on the basis of a comparison of the time ($t_1$) with times at which the parking places (P) become occupied, determines in which parking place the respective vehicle is parked.

It is noted that from US 2004/0192352 A1, as such, the use of a motion sensor in a vehicle is known. This known motion sensor, however, does not work together with time measuring means and is not part of a license device for cooperation with a parking sensor network, but is part of a tracking device. After the vehicle has come to a standstill, the known motion sensor activates a GSM apparatus, in order to initiate a locating action via the GSM network. A determination of the time at which a parking place becomes occupied is not known from this reference.

It is further noted that WO 2007/045250 (Cartime Technologies) describes a method for automatic payment of traffic-related amounts, such as, for example, parking fees. To this end, the position of a vehicle is determined with the aid of a mobile device which is in the vehicle, in two steps. In a first step the position of the vehicle is approximately determined with the aid of a satellite system, such as, for example, GPS or Galileo. The thus established rough position is thereupon corrected with so-called EGNOS (European Geostationary Navigation Overlay Service) corrections. The thus established position is thereupon transmitted to a central computer. However, no use is made of any parking sensor modules. Nor does the mobile device which is in the vehicle comprise any motion sensor which cooperates with time measuring means. Although it is determined whether the vehicle is standing still or moving, this is done by verifying for a short period of time whether the position determined by the satellite system changes or not. Time measurement takes place in the central computer.

In the following, the invention will be described in more detail with reference to the appended drawings.

Figure 1:
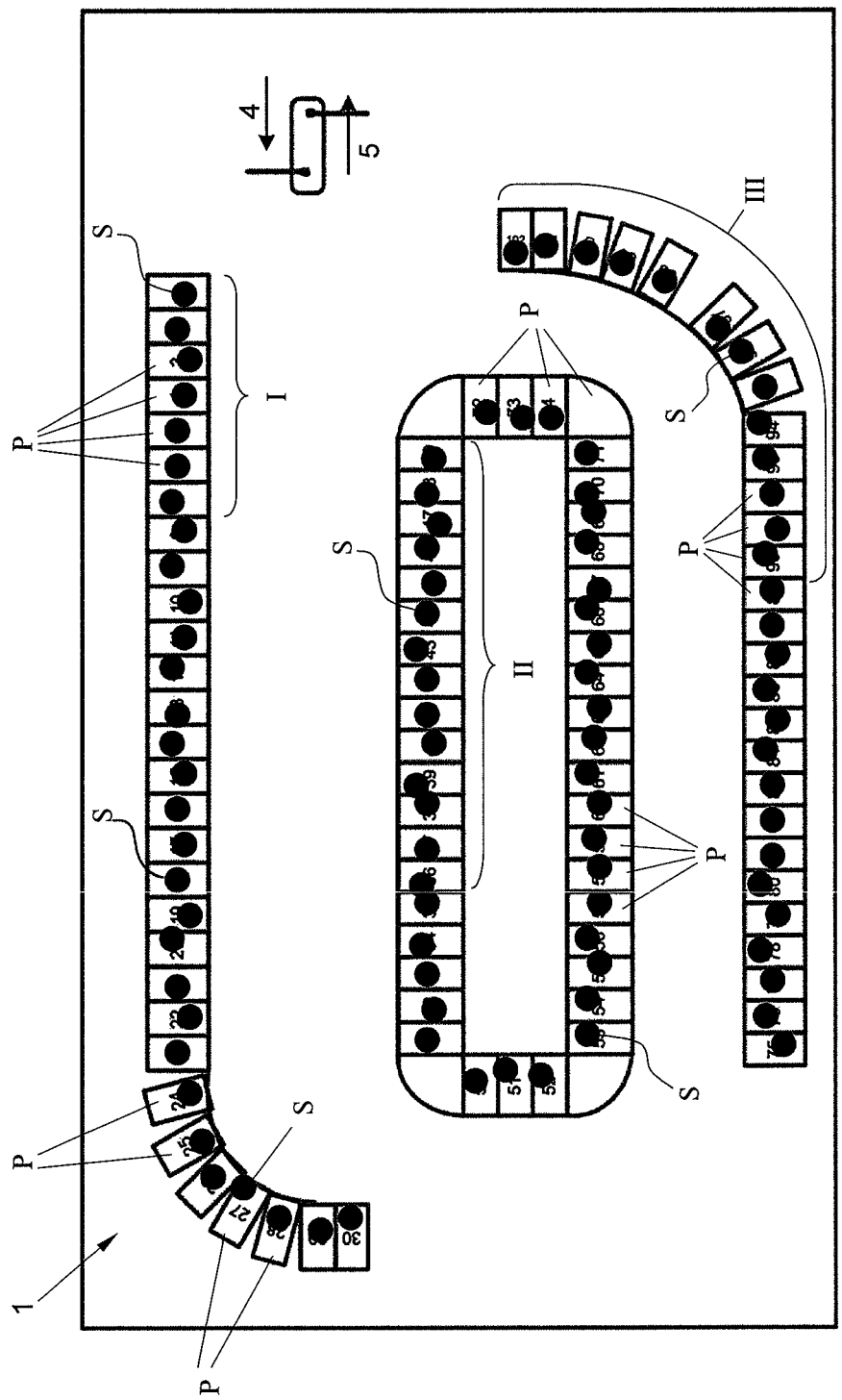
FIG. 1 shows schematically an example of a map of a parking arrangement, in which the invention can be used.

FIG. 1 shows schematically a map of an example, already described in applicant's older Dutch patent application NL 2006154, of a parking arrangement 1, in this case a parking lot, where the invention can be used. The parking lot comprises a number of parking places P, which, in this example, are each provided with a parking sensor module S, also named sensor node, symbolized with a dot. Furthermore, in this example an entrance 4 and an exit 5 are present.

Figure 2:
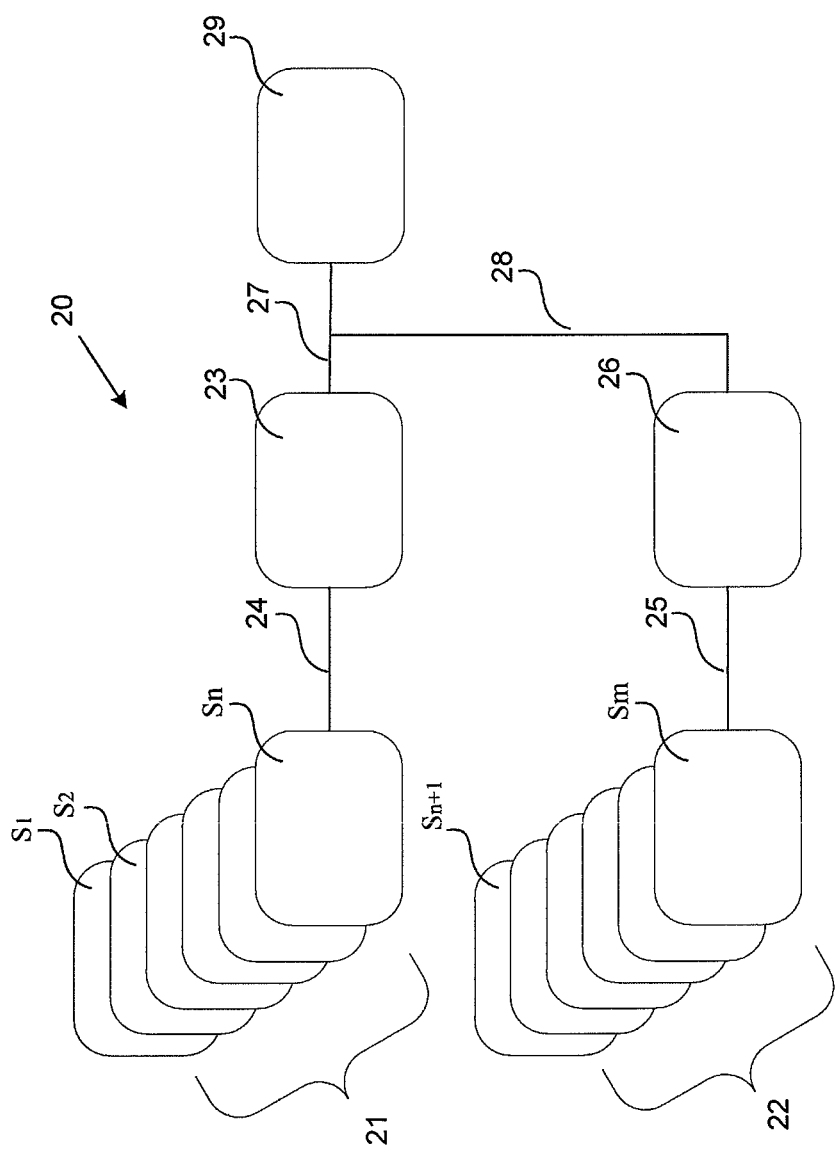
FIG. 2 shows schematically an example of a vehicle detection system for a parking arrangement of the type shown in FIG. 1.

FIG. 2 shows schematically an example, likewise already described in applicant's older Dutch patent application NL 2006154, of a vehicle detection system 20, which can be used in a parking arrangement of the type shown in FIG. 1, i.e., a parking arrangement with parking places which are each provided with at least one sensor node S. The vehicle detection system 20 shown comprises a number of sensor nodes denoted with $S_1, S_2, \ldots S_n, S_{n+1}, \ldots S_m$, which, as described in the above-mentioned older Dutch patent application NL 2006154 and in applicant's already mentioned Dutch patent NL 2001994, can comprise, for example, magnetic sensors. In this example, though not necessarily so, the sensor nodes are divided into a number of groups, whereby the sensor nodes of a group can communicate with an intermediate station, which in turn can communicate with the central computer of the vehicle detection system.

In the example shown, the sensor nodes $S_1 \ldots S_n$ form a first group 21 and the sensor nodes $S_{n+1} \ldots S_m$ form a second group 22. Group 21 can communicate with an associated intermediate station 23 via a connection 24, while group 22 can communicate with an intermediate station 26 via a connection 25.

The intermediate stations 23 and 26 can communicate with the central computer 29 via connections 27, 28. The connections 24, 25, 27 and 28 could, if desired, consist wholly or partly of wired connections, but are preferably wireless connections. When in a parking place a condition change occurs, as a result of a vehicle arriving or leaving, this is detected by the sensor node associated with that parking place and passed on via the associated intermediate station to the central computer.

It is noted that, as also described in the above-mentioned Dutch patent application 2001994, a parking arrangement according to the invention may also be so configured that the sensor nodes communicate directly or via other sensor nodes with the central computer without intervention of intermediate stations such as the intermediate stations 23 and 26.

It is further noted that, if desired, it is possible to provide a parking place with more than one sensor node. In the present description of an exemplary embodiment of the invention, the starting point is an automatic vehicle detection system with a single sensor node per parking place. Further, more or fewer than two groups of parking places with associated sensor nodes may be used, depending on the nature of the parking arrangement.

A parking arrangement of the above-described kind may be wholly or partly laid out with specific parking places for special groups of users. Thus, for example, a number of parking places may be intended for the disabled. Also, a part of the parking arrangement may be intended for license-holders or for VIP parkers. Furthermore, particular parking places may be intended for cars to be rented or for subscribers, etc.

In FIG. 1 there are shown, by way of example, a first group of parking places for the disabled, indicated at I, and a second group of parking places for VIP parkers, indicated at II. Further, at III a group of parking places for subscribers or license-holders is indicated.

In order to be able to check a correct use of the various parking places and/or to be able to verify if any, and if necessary what amount of, fees are to be charged for the use of particular parking places, it is important to be able to check automatically who, and what vehicle, respectively, is making use of a parking place. Another use may be, for example, tracing a (rental) vehicle in the parking lot.

According to the invention, to this end, use is made of an electronic license (E-license), which is embodied in an electronic license device, which can be carried along in or on a vehicle of a license-holder.

Figure 3:
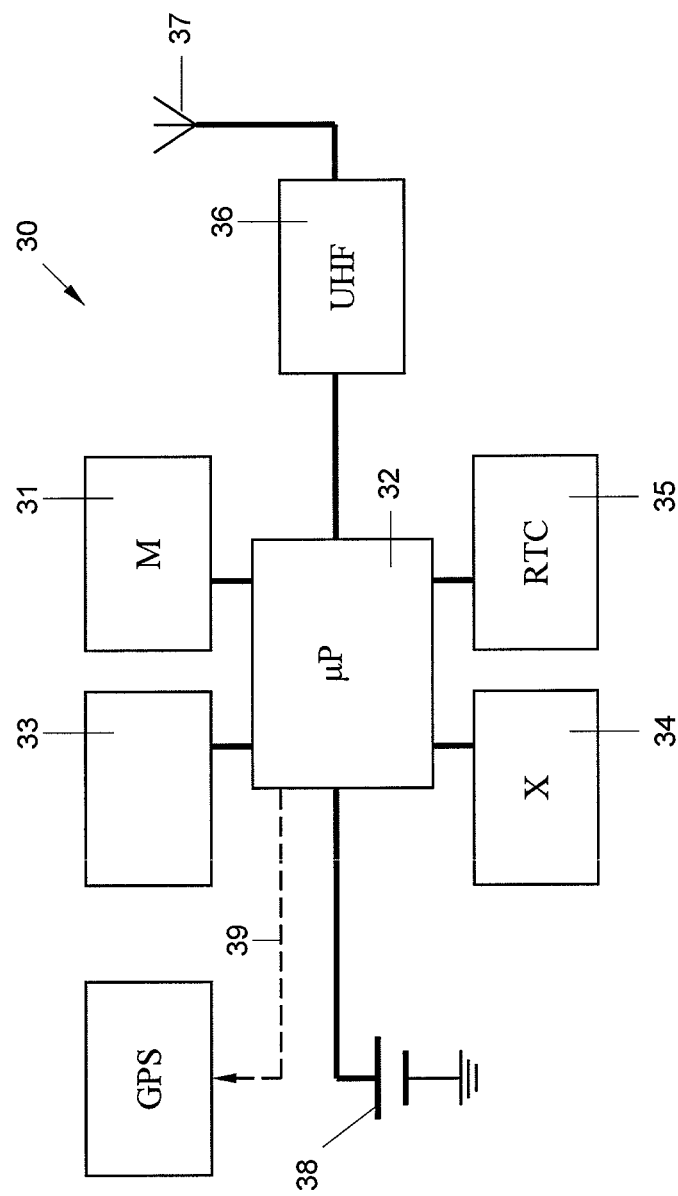
FIG. 3 shows schematically a block diagram of an example of a license device according to the invention.

FIG. 3 shows schematically an exemplary embodiment of a license device according to the invention. The license device 30 shown, which could also be named (license) pass, license means, etc., while the term "license" could be replaced with the term "permit" or a similar term, comprises a memory 31, in which a unique identification number is stored and which is connected with a microprocessor 32. The license device 30 furthermore comprises very low energy motion sensor means 33, hereinafter also named motion sensor, which is likewise connected with the microprocessor. Such an energy-saving motion sensor is commercially available, for example, from Analog Devices or from VTI Technologies. From VTI Technologies, the type CT/A3000-D01 is suitable for use in a license device according to the invention. Further, time measuring means comprising an accurate crystal 34 and a clock circuit 35, which indicates the real (local) time (RTC=Real Time Clock), are connected with the microprocessor.

The license device comprises furthermore an UHF radio circuit 36, which is connected with the microprocessor and in operation is controlled by the microprocessor, and which is provided with an antenna 37. Finally, an energy source in the form of a battery 38 is present to provide the license device with the necessary supply voltage.

The invention is based on the idea that it is possible, on the basis of a comparison of the exact time, determined by the motion sensor 33, at which a vehicle present in the parking arrangement comes to a standstill, with the exact moment at which a parking sensor module indicates that the associated parking place is becoming occupied, to determine above which parking sensor module and hence in which parking place the vehicle is parked. When the vehicle stands parked, via the UHF radio circuit the unique number of the license device and a signal representing the exact time of standstill are transmitted, and received by a wireless parking network of the parking arrangement and/or by a UHF receiver connected with the central computer of the parking arrangement. The central computer can then determine which parking place was becoming occupied at the same moment and thus link this (most probable) parking place to the respective license device. Thereupon it can then be determined whether the vehicle is in a permitted parking place, and/or the parking duration should be measured, etc.

Figure 4:
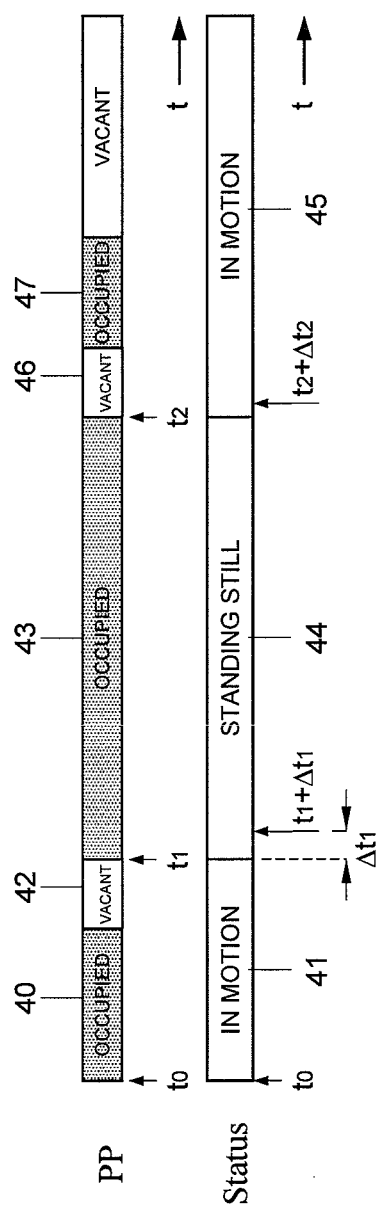
FIG. 4 shows by way of example a possible time diagram of the use of a parking place and the associated status of a license device according to the invention.

More in detail, the electronic license system functions as follows. When a vehicle that is provided with an electronic license device according to the invention starts driving, this is detected by the very low energy motion sensor. When after a settable short wait time the vehicle is still in motion, the status of the license device changes from STANDING STILL to IN MOTION. When the vehicle has arrived at the parking lot provided with a parking network and has been parked, the motion sensor detects that the vehicle is standing still. After a settable wait time the status of the license device changes to STANDING STILL and the exact moment of standstill is stored internally. All this is schematically graphically represented in FIG. 4. FIG. 4 shows in the upper time line PP the condition of a parking place, which can be VACANT or OCCUPIED. In the lower time line "Status", by way of example, the status of a license device is represented. At a random starting time to, the parking place is occupied, as indicated at 40, and the vehicle provided with the license device is moving (41). At some point, the vehicle enters the parking lot and is parked in the parking place which has meanwhile become vacant (42). Consequently, the parking place is occupied from time $t_1$ (43). This fact is passed on via the parking network and stored in the central computer. A short time later, at time $t_1+\Delta t_1$, the status of the license device changes to STANDING STILL (44). The exact moment of standstill, i.e., time $t_1$, is then stored internally in the working memory of the microprocessor of the license device. Time $\Delta t$ is a short wait time to prevent the status of the license device being changed already in the event of an intermediate brief interval of standstill. The wait time $\Delta t$ is preferably settable and, depending on the wishes of the operator and/or user, may last, for example, a few seconds to a couple of minutes. In a practical situation, $\Delta t$ can be, for example, about 10 seconds.

At time $t_1+\Delta t_1$, via the UHF radio circuit 36, 37, the parking network and/or the central computer are approached. As soon as a link is established, the internal clock 35 is synchronized with the clock of the parking network to compensate any time differences between the license device and the parking network. If necessary, also time $t_1$ is then adapted. Next, via the UHF radio link 36, 37, a message including the identification number of the license device and the exact moment of standstill is transmitted to the parking network and/or the central computer. The parking place has become occupied from time $t_1$, as indicated with 43, which is detected by the parking sensor module of that parking place and is passed on via the parking network to the central computer. The information from the parking sensor module and from the license device is stored in a database. Through combination of this information, as already noted, the license device can be linked to a most probable specific occupied parking place and the result thereof can be processed further.

In the diagram shown in FIG. 4, the status of the license device changes at time $t_2$ again, to IN MOTION (45). This occurs after a short wait time $\Delta t_2$ after the vehicle has actually started to move, so as to be sure that the vehicle is indeed driving away from the parking place. The parking sensor module at the same time indicates that the parking place is vacant again (46). This parking place may subsequently be occupied again by another vehicle, as indicated at 47. If desired, the time $t_2$ may also be transmitted via the parking network or directly to the central computer, and through a comparison of times as described earlier, it may be checked whether the vehicle does indeed drive away from the parking place previously linked to it. However, when the vehicle moves beyond the range of the parking network, the license device cannot communicate with the parking network anymore, so that it becomes automatically clear that the vehicle has left the parking lot.

Figure 5:
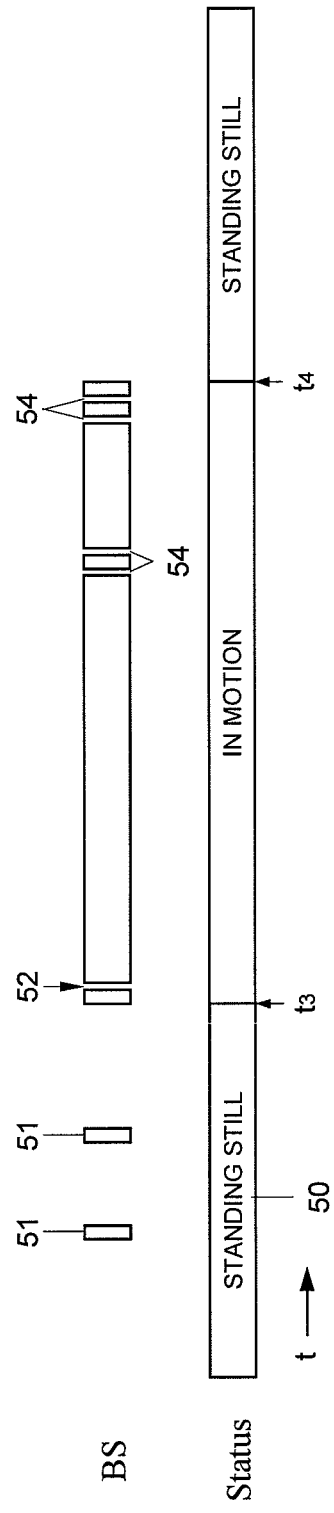
FIG. 5 shows schematically a time diagram of an example of, and possible course of, the signal provided by the motion sensor of a license device according to the invention and of the corresponding status of the license device.

FIG. 5, for completeness sake, shows once again in a time bar a possible course of a signal provided by a motion detector BS, together with an associated status of the license device in a method and apparatus according to the invention. The time bar starts with an interval 50, in which the vehicle is standing still and the status of the license device is STANDING STILL. During the interval 50, in this example, the motion sensor generates a short signal 51 twice. These signals, however, occur so briefly that the wait time $\Delta t_2$ (FIG. 4) is not exceeded, so that the status of the license device does not change. Such signals may occur, for instance, due to a gust of wind or someone or something bumping against the vehicle. At time $t_3$ the vehicle starts moving and although shortly afterwards a brief stop occurs as indicated at 52, this stop does not exceed the wait time $\Delta t_1$ and the status of the license device remains IN MOTION. Despite further short stops, indicated at 54, the status of the license device remains unchanged until at time $t_4$ the vehicle comes to a standstill long enough for the status to change back again to STANDING STILL. After the earlier-described wait time, the license device starts to approach the parking network via the UHF radio circuit 36, 37. If no parking network is found, the vehicle is parked some place where there is no parking network. The UHF radio circuit is then preferably switched off until a new STANDING STILL status is detected. Also during the status IN MOTION, the UHF radio circuit is preferably switched off. In this way, the relatively high-energy UHF radio is switched on selectively and as briefly as possible, and a relatively long life of the battery 38 is obtained.

If a parking network is found, the events already described above proceed to take place, whereby the license device is recognized and the parking place where the vehicle is, is determined.

By linking (:"matching") the time at which a vehicle comes to a standstill to the time at which a parking sensor module delivers an occupation signal, it can be determined with high accuracy in which parking place the vehicle is parked. Especially in the case of a very busy parking arrangement it is possible, in theory, that two parking places become occupied at virtually the same time. For this reason it has already been indicated above that the central computer determines the most probable parking place where a vehicle provided with a license device is parked. The central computer may also, if desired, be so configured that it provides a list of possible parking places where a vehicle may be parked, arranged according to the degree of probability.

If desired, the chances that the central computer matches an incorrect parking place with a license device may be reduced by applying a secondary locating system. To this end, the motion sensor can be used to switch on, directly or via the microprocessor, a typically high-energy additional locating system, such as, for example, GPS or Galileo or the like or a local locating system, such as described, for example, in NL 2005776. All this is indicated in FIG. 3 with an interrupted arrow 39 to a block GPS. After the motion sensor has detected that the vehicle is parked, the motion sensor, to this end, directly or indirectly, in this example via the microprocessor 32, briefly switches on the additional locating system until the extra location information is available. Then this extra information can also be transmitted to the central computer, so that the latter can determine still more accurately in which parking place the vehicle is parked.

The energy-saving motion sensor can also be used to give the user an audio/visual feedback message. At the moment that the motion sensor detects motion and the license device goes from status STANDING STILL to status IN MOTION, the driver of the vehicle is present in the vehicle and various messages may be delivered, for example, E-license functioning, battery low, or the like.

It is noted that after the foregoing, diverse modifications will readily occur to those skilled in the art. Such modifications are understood to fall within the scope of the invention as defined in the appended claims.

The invention claimed is:

1. A method for automatically detecting and checking the use of at least a number of parking places, each provided with at least one electronic parking sensor module, of a parking arrangement, which is provided with a parking network for communication between the electronic parking sensor modules and a central computer, wherein the electronic parking sensor modules are each provided with an identification code and with at least one vehicle sensor for detecting the presence or absence of a vehicle in the respective parking place;

and wherein use is made of electronic license devices, which can be carried along in or on vehicles which can be parked in said parking places, the license devices being each provided with a unique identification number and with transmitting means to transmit the identification number of the license device of the respective vehicle directly or indirectly to the central computer, wherein the central computer is configured to determine in which parking place the respective vehicle is parked, wherein the license devices are provided with motion sensor means, which together with time measuring means can determine exactly at what time a vehicle comes to a standstill; wherein the transmitting means are configured to transmit information about the time together with the identification number of the license device of the respective vehicle directly or indirectly to the central computer; and wherein the central computer on the basis of a comparison of said time with times at which the parking places become occupied determines in which parking place the respective vehicle is parked.

2. The method according to claim 1, wherein after the time at which the vehicle comes to a standstill a short period of waiting follows before the license device approaches the parking network and/or the central computer by means of the transmitting means.

3. The method according to claim 1, wherein after the vehicle has come to a standstill, by the motion sensor means directly or indirectly an additional locating system is switched on for providing extra location information.

4. The method according to claim 1, wherein time measuring means are used, which comprise a real time clock, and that the real time clock is synchronized with a clock of the parking network and/or the central computer, before the time at which a vehicle comes to a standstill is compared with the times at which parking places become occupied.

5. The method according to claim 1, wherein the transmitting means are switched off as long as the vehicle is in motion, and when the vehicle is parked in a place where no parking network is present.

6. The method according to claim 1, wherein with the aid of the motion sensor means and the time measuring means it is determined at what time a parked vehicle drives away from a parking place and that the transmitting means transmit information about said time together with the identification number of the license device directly or indirectly to the central computer.

7. A method for automatically detecting and checking the use of at least a number of parking places, each provided with at least one electronic parking sensor module, of a parking arrangement, which is provided with a parking network for communication between the electronic parking sensor modules and a central computer, wherein the electronic parking sensor modules are each provided with an identification code and with at least one vehicle sensor for detecting the presence or absence of a vehicle in the respective parking place;

and wherein use is made of electronic license devices, which can be carried along in or on vehicles which can be parked in the parking places, the license devices being each provided with a unique identification number and with transmitting means to transmit the identification number of the license device of the respective vehicle directly or indirectly to the central computer, wherein the central computer is configured to determine in which parking place the respective vehicle is parked, wherein the license devices are provided with motion sensor means, which together with time measuring means can determine exactly at what time a vehicle comes to a standstill; wherein the transmitting means are configured to transmit information about the time together with the identification number of the license device of the respective vehicle directly or indirectly to the central computer; and wherein the central computer on the basis of a comparison of said time with times at which the parking places become occupied determines in which parking place the respective vehicle is parked;

and wherein after the vehicle has come to a standstill, by the motion sensor means directly or indirectly an additional locating system is switched on for providing extra location information;

and wherein time measuring means are used, which comprise a real time clock, and the real time clock is synchronized with a clock of the parking network and/or the central computer, before the time at which a vehicle comes to a standstill is compared with the times at which parking places become occupied.

8. A system for automatically detecting and checking the use of at least a number of parking places, each provided with at least one electronic parking sensor module, of a parking arrangement, which is provided with a parking network for communication between the electronic parking sensor modules and a central computer, wherein the electronic parking sensor modules are each provided with an identification code and with at least one vehicle sensor for detecting the presence or absence of a vehicle in the respective parking place;

and wherein the system furthermore comprises one or more electronic license devices, which in operation can be carried along with the vehicles which can be parked in said parking places, the license devices being each provided with a unique identification number and with transmitting means to transmit the identification number of the license device of the respective vehicle directly or indirectly to the central computer, wherein the central computer is configured to determine in which parking place the respective vehicle is parked, wherein the license devices are provided with motion sensor means, which together with time measuring means can determine exactly at what time a vehicle comes to a standstill; wherein the transmitting means are configured to transmit information about the time together with the identification number of the license device of the respective vehicle directly or indirectly to the central computer; and wherein the central computer on the basis of a comparison of said time with times at which the parking places become occupied determines in which parking place the respective vehicle is parked.

9. The system according to claim 8, wherein the license device comprises a microprocessor, which is connected with the motion sensor means and with time measuring means and which is furthermore connected with a radio circuit for transmitting information to the parking network and/or the central computer.

10. The system according to claim 8, wherein the motion sensor means are configured for, after a vehicle has come to a standstill, directly or indirectly switching on an additional locating system for providing extra location information.

11. The system according to claim 10, wherein the license devices are configured to transmit also the extra location information to the parking network and/or the central computer.

12. The system according to claim 8, wherein the time measuring means comprise a real time clock and that the license devices are configured to synchronize the real time clock with a clock of the parking network and/or the central computer before the time at which a vehicle comes to a standstill is compared with the times at which parking places become occupied.

13. The system according to claim 8, wherein the license devices are configured to switch off the transmitting means as long as the vehicle is in motion and when the vehicle is parked in a place where no parking network is present.

14. The system according to claim 8, wherein the license devices are configured to determine at what time a parked vehicle drives away from a parking place provided with a parking sensor module and to transmit information about this time together with the unique identification number directly or indirectly to the central computer.

15. A system for automatically detecting and checking the use of at least a number of parking places, each provided with at least one electronic parking sensor module, of a parking arrangement, which is provided with a parking network for communication between the electronic parking sensor modules and a central computer, wherein the electronic parking sensor modules are each provided with an identification code and with at least one vehicle sensor for detecting the presence or absence of a vehicle in the respective parking place;

and wherein the system furthermore comprises one or more electronic license devices, which in operation can be carried along with the vehicles which can be parked in said parking places, the license devices being each provided with a unique identification number and with transmitting means to transmit the identification number of the license device of the respective vehicle directly or indirectly to the central computer, wherein the central computer is configured to determine in which parking place the respective vehicle is parked, wherein the license devices are provided with motion sensor means, which together with time measuring means can determine exactly at what time a vehicle comes to a standstill; wherein the transmitting means are configured to transmit information about the time together with the identification number of the license device of the respective vehicle directly or indirectly to the central computer; and wherein the central computer on the basis of a comparison of said time with times at which the parking places become occupied determines in which parking place the respective vehicle is parked;

and wherein the motion sensor means are configured for, after a vehicle has come to a standstill, directly or indirectly switching on an additional locating system for providing extra location information;

and wherein the time measuring means comprise a real time clock, and the license devices are configured to synchronize the real time clock with a clock of the parking network and/or the central computer before the time at which a vehicle comes to a standstill is compared with the times at which parking places become occupied.

* * * * *